Figure 1:
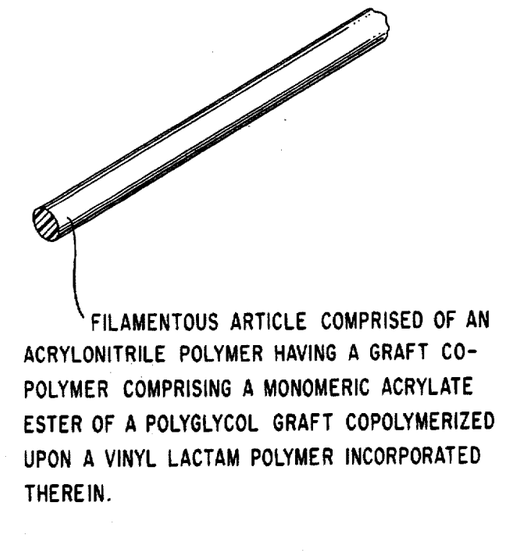

April 23, 1963 A. ARMEN ET AL 3,086,956
VARIOUS POLYMERS OF CERTAIN ACRYLATE AND METHACRYLATE
MONOESTERS OF POLYGLYCOLS AND IMPROVED ACRYLONITRILE
POLYMER COMPOSITIONS OBTAINABLE THEREWITH
Filed Nov. 25, 1957

FILAMENTOUS ARTICLE COMPRISED OF AN
ACRYLONITRILE POLYMER HAVING A GRAFT CO-
POLYMER COMPRISING A MONOMERIC ACRYLATE
ESTER OF A POLYGLYCOL GRAFT COPOLYMERIZED
UPON A VINYL LACTAM POLYMER INCORPORATED
THEREIN.

INVENTORS.
ARDY ARMEN
STANLEY A. MURDOCK

BY *Griswold & Burdick*
ATTORNEYS

United States Patent Office 3,086,956
Patented Apr. 23, 1963

3,086,956
VARIOUS POLYMERS OF CERTAIN ACRYLATE AND METHACRYLATE MONOESTERS OF POLYGLYCOLS AND IMPROVED ACRYLONITRILE POLYMER COMPOSITIONS OBTAINABLE THEREWITH
Ardy Armen and Stanley A. Murdock, Concord, Calif., assignors to The Dow Chemical Company, Midland, Mich., a corporation of Delaware
Filed Nov. 25, 1957, Ser. No. 698,767
42 Claims. (Cl. 260—45.5)

The present invention resides in the general field of organic chemistry and contributes specifically to the polymer art, especially with respect to various polymer compositions, including, in particular, conventional copolymers and graft copolymers, and fiber-forming polymer blends obtainable therewith. It is particularly concerned with various polymer products of certain monofunctional monomeric acrylate and methacrylate monoesters of polyglycols that have non-reactive terminal end groups, which polymer products have especial utility as dye-receptive and/or antistatic and/or stabilizing additaments for acrylonitrile polymer compositions, which, advantageously, may be of the fiber-forming variety. The invention is also concerned with the compositions that may be obtained by blending the polymer products with acrylonitrile polymers, as well as with shaped articles which have been fabricated from such compositions and which, as a consequence, have significantly enhanced properties and characteristics as regards improvements in and relating to either enhanced dye-receptivity, minimized inherent propensity to accumulate electrostatic charges, natural stability to various deteriorating influences, including stability against becoming deleteriously influenced and degraded upon exposure to heat at elevated temperatures and to light or to more than one or all of such particulars.

There are known to exist various unsaturated mono- and diesters and mixtures thereof of various glycols and polyglycols. These monomers may be converted to polymeric products by taking advantage of their unsaturated structure. Such polymeric materials, however, may not be suitable for certain purposes. Furthermore, many of them may not be substantive to or adherescent upon various hydrophobic synthetic textile fibers and the like articles. Hence, they generally may not be well adapted for utilization in combination with such articles.

It would be an advantage to provide new water soluble and hydrophilic polymer products that, among other uses, might be employed with great benefit as dye-receptive and/or antistatic and/or stabilizing additaments or agents for certain hydrophobic synthetic textile fibers and the like, particularly acrylonitrile polymer fibers.

Therefore, one object of the present invention is to provide, as new compositions of matter, water-soluble polymeric compositions that contain, as essential ingredients of their constitution, the characterizing recurring group or unit:

wherein Z is selected from the group consisting of hydrogen and methyl; X is selected from the group consisting of halogens of atomic number 17 to 53 (i.e., chlorine, bromine and iodine), alkoxy radicals containing from 1 to 2 carbon atoms (i.e., —OCH$_3$ and —OC$_2$H$_5$) and thioalkyl radicals containing from 1 to 2 carbon atoms (i.e., —SCH$_3$ and —SC$_2$H$_5$); $n$ is a number having an average value of from 5 to 100; and $m$ is a number that includes zero and has an average value that may be as large as 10.

Thus, a specific objective of the invention is to provide various polymeric products from water-soluble monoethylenically unsaturated monomers of the structure:

$$CH_2=CZCO(OC_2H_4)_n(OC_3H_6)_mX \quad (I)$$

wherein all the generic terms have the above indicated meanings and values.

Another object is to provide water-soluble homopolymers of the above-indicated monomers, having the structure:

wherein the terms are likewise as in the foregoing and $y$ is a plural integer having a value up to about 500, advantageously between about 10 and 200.

A related objective of the invention is to provide graft copolymers of the above indicated monomers of the Formula I upon or with various trunk or base substrate vinyl lactam polymers, particularly poly-N-vinylpyrrolidone, which is also known as being poly-N-vinyl-2-pyrrolidone.

Still another objective of the invention is to provide conventional or "straight" copolymers of the above indicated monomers of the Formula I with various monomeric, vinyl or other alkenyl group-containing, organic sulfonic acids or derivatives thereof that are selected from the group of such compounds (including mixtures thereof) consisting of those represented by the formulae:

(Aromatic organic sulfonic acid compounds) (II)

$$CH_2=CH—(CH_2)_m—SO_3X$$

(Alkenyl organic sulfonic acid compounds) (III)

(Sulfoalkylacrylate organic sulfonic acid compounds) (IV)

(Acryloyl taurine homolog compounds) (V)

and (Allyl taurine homolog compounds) (VI)

all wherein X is hydrogen, an aliphatic hydrocarbon radical containing from 1 to 4 carbon atoms ar an alkali metal ion (including sodium, potassium and lithium); Y is hydrogen, chlorine or bromine; R is methyl or ethyl; Z is hydrogen or methyl; $m$ has a numerical value in whole number increments from 0 to 2; $n$ has a numerical value of 1 or 2; $p$ is 0 or 1; and $r$ is 1 to 4.

Yet another related objective of the present invention is to provide graft copolymers of a polyvinyllactam, particularly poly-N-vinylpyrrolidone, trunk or base upon which there is graft copolymerized mixtures of monomers consisting of (a) monofunctional acrylate or methacrylate monoesters of polyglycols that have non-reactive terminal end groups of the Formula I and (b) at least one member of the monomeric, vinyl or other alkenyl group-containing organic sulfonic acids or derivatives thereof that are members of the group of those having the Formulae II, III, IV, V and VI.

Within the main purpose and primary design of the present invention is the provision of the indicated varieties of polymeric products that are especially well suited for being incorporated in acrylonitrile polymer compositions, particularly compositions of polyacrylonitrile, to serve in one or more and advantageously all of the indicated capacities of dye-assisting adjuvants, antistatic agents and stabilizing ingredients, frequently in a simultaneous treble capacity along each and all of the indicated lines. It is also a principal aim and chief concern of the invention to provide and make available acrylonitrile polymer compositions and shaped articles therefrom that contain the above-indicated and hereinafter more fully delineated type of polymeric additaments which compositions have, as intrinsic distiguishing characteristics, either excellent receptivity of and acceptability for any of a wide variety of dyestuffs; permanently imbued antistatic properties that are unusually good for and not commonly encountered in polymeric materials of the synthetic, essentially hydrophobic varieties of such substances; or efficacious natural stability to heat and light, as well as to certain chemical conditions, such as alkaline environments, or, advantageously, more than one or all three of such characteristics at one and the same time.

Within the scope and purview of the invention, there is comprehended (1) the novel and utile polymer products of the indicated varieties; (2) the advantageous polymer compositions, particularly fiber-forming compositions, obtained by blending the polymer products with acrylonitrile polymers; (3) various shaped articles fabricated from and comprised of the polymer product-containing acrylonitrile polymer compositions; and (4) methods for the preparation of the above-indicated compositions.

The polymer blend compositions of the present invention which fulfill the above-indicated ends and offer corollary advantages and benefits, particularly as fiber-forming compositions as will hereinafter be manifest, are, in essence, comprised of an intimate and practically inseparable blend or alloy constitution of (A) an acrylonitrile polymer that contains in the polymer molecule at least about 80 percent by weight of polymerized acrylonitrile which, preferably, is of the fiber-forming variety and, most advantageously, is polyacrylonitrile and (B) a minor proportion of any of the above-indicated varieties of beneficial polymeric products or polymeric additaments, including homopolymers, copolymers and graft copolymers, that function in the described manner.

The methods of the invention by which the herein contemplated advantageous compositions may be made involve preparation of the various polymer products as well as incorporation of a minor proportion of such polymer products as beneficial additaments in and with the acrylonitrile polymer base by any of several beneficial techniques, hereinafter more thoroughly defined, adapted to suitably accomplish the desired result.

Without being limited to or by the specific embodiments and modes of operation set forth, the invention is illustrated in and by the following didactic examples wherein, unless otherwise indicated, all parts and percentages are to be taken on a weight basis.

EXAMPLE 1

About 2000 grams of a polyethylene glycol monomethyl ether having an average molecular weight of about 600 and 98 grams of methyl methacrylate were charged to a 5000 ml. round bottom flask that was equipped with a distillation column. About 10 grams of para-toluene sulfonic acid was added to the reaction mass as a catalyst and 5 grams of hydroquinone as a polymerization inhibitor. The mixture was heated in an oil bath at 120° C. and the methanol that was formed during the ensuing reaction (which is represented by the equations set forth in the subsequent specification) was removed through the column. About 90 percent of the reactant materials were converted to the desired monomer product, as indicated by the quantity of collected methanol that was recovered during the reaction which was terminated after about a 6 hour period. The excess methyl methacrylate was then stripped from the reaction mass under a vacuum as represented by an absolute pressure of 20 mm. Hg at 120° C. The residue was a homogeneous, slightly colored liquid. Because of its low volatility, the monomer could not easily be purified by distillation. In order to convert it to a condition suitable for polymerization, however, the hydroquinone inhibitor was removed from the heated reaction mass by passing the liquid product at room temperature through a column containing an anionic quaternary ammonium type of ion exchange resin ("Dowex 1"). This treatment also removed the slight coloration that was present in the reaction mass. Analysis of the monomeric composition indicated that it had a structural formula similar to that set forth in the Formula I wherein Z was methyl, X was methoxy, $n$ had an average value of about 13 and $m$ was 0.

The monomeric product could be employed for the preparation of homopolymers, as well as for conventional polymers with any of the varieties of monomeric organic sulfonic acids mentioned herein and for the preparation of graft copolymers upon various polyvinyllactams, such as poly-N-vinylpyrrolidone, either individually or in combination with monomeric sulfonic acids. All of the polymer product so obtainable provide beneficial results when incorporated in the acrylonitrile polymer fibers by any desired means such as by the technique set forth in the subsequent Example 6.

EXAMPLE 2

A 12 liter, 3-necked, round bottom flask was equipped with a mechanical agitator, a nitrogen bubbler tube (or sparger) and a fractionating column. The fractionating column had an internal diameter of about 65 mm. and a height of about 36 inches. It was packed with 8 by 8 mm. glass Raschig rings. The column was also equipped with a condenser and an automatic take-off head capable of being adjusted to any desired reflux ratio. The 12 liter flask was heated with an electrical mantel.

Into the flask there was charged about 5000 grams of a polyethylene glycol monomethyl ether having an average molecular weight of about 600; about 3000 grams of methyl methacrylate; about 250 grams of para-toluene sulfonic acid; and about 250 grams of hydrated copper sulfate ($CuSO_4 \cdot 5H_2O$). The toluene sulfonic acid was employed as a transesterification catalyst and the copper sulfate as a polymerization inhibitor. Nitrogen bubbling was commenced through the charged ingredients in the reactor. At the same time, the agitation was commenced and heat was applied to the reaction mass. Within 20 minutes vapors were observed at the top of the fractionating column. The column was run on total reflux for about two hours to permit the overhead temperature to drop to about 66° C. which indicated that a mixture of about 35 percent vaporized methyl methacrylate and 65 percent vaporized methanol was passing out of the column. At this point the temperature of the reaction mass was about 110° C. The automatic take-off head was then set for about a 10 percent removal of condensate. At this reflux ratio, the overhead temperature in the fractionating column remained constant. After about 3 hours of additional operation, the overhead temperature in the fractionating column began to steadily increase. When the overhead temperature reached about 80° C., the heating of the reaction mass was discontinued, at which point its temperature was about 121° C. The reaction mass was then permitted to cool for about an hour after which the toluene sulfonic acid was neutralized with about 200 grams of sodium acetate. Two liters of water were then added to the reactor and the contents thereof subjected to steam distillation until no sign of methyl methacrylate could be observed in the distillate. The residue in the reactor after the steam distillation was found to be comprised of a clear, green colored solution that contained some particles of polymer in the form of small round beads. The polymer particles were filtered from the reaction mass to yield about 6610 grams of a clear green aqueous solution containing the methoxy polyglycol methacrylate, the unreacted monomethyl ether of the polyglycol, copper sulfate and the neutralized toluene sulfonic acid. The filtrate, upon analysis by bromination, was found to contain about 0.945 mole per kilogram of ethylenically unsaturated double bonds (C=C). This corresponded to about a 75 percent yield of the desired monomeric methoxy polyglycol methacrylate.

About 5000 grams of the filtrate was extracted in a separatory funnel with about 4000 grams of dichloroethane by mixing the filtrate and the solvent together in a vigorous fashion. The separatory funnel was placed in a cold room for about 16 hours wherein it was maintained at a temperature of about $-18°$ C. Upon removal from the cold room, it was found that two sharp layers had formed. The upper aqueous layer was light green in color. The lower oleaginous layer was clear and light brown in color. When the layers were separated and analyzed for C=C by bromination, the oil layer, consisting of about 6925 grams, was found to contain about 0.631 mole of C=C per kilogram and the water layer, consisting of about 2190 grams, was found to contain about 0.15 mole of C=C per kilogram. The weight increase of the oil layer was about 2925 grams. By material balance, about 93 percent of the unsaturated material was recovered in the single extraction with dichloroethane.

About 400 grams of a solution of the monomer and dichloroethane was prepared which, by bromine analysis, was found to contain about 0.48 mole C=C per kilogram of solution. The monomer solution was inhibited against polymerization by addition thereto of about one gram of hydroquinone. The inhibited solution was evaporated under vacuum (2 mm. Hg absolute) at a temperature of from 35 to 40° C. until all of the dichloroethane solvent had been essentially removed. The resulting monomer product weighed about 111 grams and was found to contain about 1.45 moles C=C per kilogram. Essentially no polymerization had occurred in the monomer recovery. The resulting monomer product was a slightly viscous light brown liquid at room temperature. Its viscosity at 25° C. was about 52 centipoises and its density at the same temperature was about 1.104 grams per cubic centimeter. Its saponification equivalent weight was found to be about 656. The monomer, upon heating, was found to either decompose or polymerize before boiling. The monomer was soluble in water, methanol, ethanol, isopropanol, perchloroethylene, dichloroethylene, carbon tetrachloride, methyl ethyl ketone, methyl isobutyl ketone and acetone. As is demonstrated in the subsequent examples, the monomer was converted to various polymeric products having excellent utility in connection with acrylonitrile polymer compositions for purposes of increasing their dye-receptivity, decreasing their static characteristics, and enhancing their stability to light, heat and alkaline media.

EXAMPLE 3

About 500 grams of a dichloroethane solution containing about 0.57 mole per kilogram of the monomeric methoxy polyglycol methacrylate obtained in the second example was diluted with dichloroethane to obtain a solution having a total weight of about 1900 grams. The resulting solution was charged into a 3-neck, 5-liter, round bottomed flask that was equipped with an electrical heating mantel and an efficient mechanical agitator, a nitrogen sparge tube and a total reflux condenser. To the charged dichloroethane solution there was added about 1.9 grams of azobisisobutyronitrile as a polymerization catalyst. The resulting polymerization mass was then maintained for about 16 hours at a temperature of about 78° C.

Upon analysis, it was found that about 93.4 percent of the original monomer charge had been converted to a polymer product. Following the polymerization, the dichloroethane was removed under vacuum at about 40° C. using a vacuum oven for the purpose. There was obtained as a product a clear viscous polymer. The viscosity of the polymer product obtained was 98 centipoises at 20° C. Its density at 25° C. was about 1.414 grams per cubic centimeter. Its saponification equivalent was about 1394, which indicated incomplete saponification in the product and considerable inherent stability of the polymer. The polymer product was soluble in water, as well as in methanol, ethanol, isopropanol, perchloroethylene, dichloroethylene, carbon tetrachloride, methyl ethyl ketone, methyl isobutyl ketone and acetone.

The foregoing was repeated excepting that, prior to polymerization, the monomer solution was passed through a bed of sulfonated polystyrene ion exchange resin in free acid form ("Dowex 50"). The resulting homopolymer had the same properties as above described excepting that it was obtained with a better color, being light brown as compared to the slightly greenish polymer that was made by polymerizing the copper sulfate-containing monomer. When incorporated in acrylonitrile polymer fibers as an additive, the homopolymer imbued them with marked antistatic properties.

EXAMPLE 4

Into a 3-necked, one-liter, round-bottomed flask equipped with a mechanical agitator and heating mantel and connected to a source of high vacuum operated at about 25 inches of mercury beneath atmospheric pressure, there was charged about 200 ml. of water and 0.5 gram of potassium persulfate. When the water began to boil under the applied vacuum, about 200 grams of a dichloroethane solution of the monomeric methoxy polyglycol methacrylate obtained in the first example and containing about 0.096 mole of the monomer was added slowly over a 20-minute period. During this time the vacuum was maintained on the flask. The dichloroethane solvent was flashed off and removed. About 10 minutes after the dichloroethane had been removed (as indicated by the vapor temperature in the flask) large soft particles of polymer began to form. Within about an hour, the reaction mass was found to consist mainly of a water-insoluble polymer material having soft and rubbery characteristics.

The foregoing experimentation was repeated with the exception that the catalyst was not added to the water until after the dichloroethane had been removed and, in addition, about 400 ml. of isopropanol was added along with the catalyst after the vacuum had been discontinued. Besides this, the reactor was equipped with a nitrogen sparger and a total reflux condenser. The polymerization was continued at the reflux temperature of about 78° C. for a 23 hour period. A very clear slightly yellow solution was obtained. After the polymerization had been terminated, about 250 ml. of additional water was added and the isopropanol-water azeotrope removed by distillation. When the last of the isopropanol was removed, the remaining solution was observed to become slightly hazy. It was found to be stable in this form. Analysis of the resulting product indicated that essentially 100 percent conversion of monomer to polymer had been obtained. The molecular weight of the polymer product was found to be rather low. This was believed to be due to the effect of the isopropanol acting as a chain transfer agent. In any event, the polymer product obtained was not cross-linked, but was soluble. When isopropanol is added to the hazy water solution of the polymer product, a very clear solution is obtained to indicate that the homopolymer has greater solubility in isopropanol than in water. Homopolymers prepared in the above-indicated manner, particularly when they are obtained in high molecular weight forms, may be employed with great benefit in acrylonitrile polymers as antistatic agents when they are incorporated therein in any desired manner, as in the manner set forth in the subsequent Example 6.

EXAMPLE 5

Using the same apparatus as described in the second example, the following reaction mass was prepared:

|  | Grams |
|---|---|
| Polyethylene glycol monochloride having a molecular weight of about 610 | 2500 |
| Methyl methacrylate | 1250 |
| Para-toluene sulfonic acid (96 percent) | 130 |

Nitrogen was bubbled through the reactor, heating commenced, and agitation started. Within about 25 minutes, vapor at 70° C. was observed in the top of the fractionating column. About one hour and 35 minutes later the overhead temperature of the column, which had been operating at total reflux, was found to be about 66° C. The automatic take-off head was then set to remove about 10 percent of the reflux. After a total period of time from the start-up of about 6 hours, the overhead temperature in the fractionating column had attained about 80° C. At this point, heating of the reactor was discontinued. About one liter of water and 100 grams of sodium acetate were then added to the reaction mass and steam was introduced into the reactor to strip the remaining unreacted methyl methacrylate. The steam distillation was stopped when no trace of methyl methacrylate could be detected in the distillate.

After the steam distillation, the reaction mass was filtered to yield a clear brown solution. The total weight of filtered product obtained was about 3005 grams which, upon bromine analysis, was found to contain about 1.70 moles C=C per kilogram. This corresponded to a 94 percent yield of desired monomeric product. About 1000 grams of the reactor product was extracted with 1000 grams of dichloroethane in a separatory funnel. When the two layers were separated, the dichloroethane layer had increased in weight to about 1838 grams. It analyzed about 0.96 mole C=C per kilogram by bromination.

Following the procedure described in the second example, about 408 grams of the oleaginous extraction layer was inhibited with about one gram of hydroquinone and evaporated under high vacuum at 35–40° C. until no detectable trace of solvent was evident. The recovered monomeric product was dark brown in color, but clear. Its viscosity (at 25° C.) was found to be about 60 centipoises and its density at the same temperature about 1.137 grams per cubic centimeter. By bromine analysis the monomer product was found to contain about 1.88 moles of C=C per kilogram. Its saponification equivalent weight was found to be about 551 and it was found to decompose or polymerize prior to boiling upon being heated. Its solubility chracteristics were the same as set forth for the monomer described in Example 2.

Homopolymers and graft copolymers of the monomer on vinyllactam polymers, as well as copolymers and mixed graft copolymers on vinyllactam polymers of the monomer with the mentioned monomeric organic sulfonic acids provided excellent polymeric additives having exceptional utility for increasing the dye-receptivity, benefiting the antistatice properties and lending to the stability of acrylonitrile polymers, particularly fiber-forming polymers and especially polyacrylonitrile when utilized in the manner set forth in the subsequent examples.

EXAMPLE 6

Into a one-liter, 3-necked, round bottomed flask that was equipped with an efficient agitator, a nitrogen sparger and a total reflux condenser, there was charged about 35 grams of the monomeric methoxy polyglycol methacrylate obtained in Example 2; about 35 grams of poly N-vinylpyrrolidone (PVP) having a Fikentscher K-value of about 45; about 280 grams of water; and about 0.7 gram of ammonium persulfate. The pH of the charge was adjusted to about 5 with hydrochloric acid. The charge was then heated to a temperature of about 60° C. and maintained at this level for about 33½ hours. Bromine analysis of the reaction mass after termination of the reaction indicated that about 80 percent of the monomer has been converted to a graft copolymer product. The polymeric product was obtained in the reaction mass as a slightly colored, turbid solution containing about 16.9 percent of dissolved solids.

Polyacrylonitrile fibers containing about 5.8 percent of the above copolymer product were prepared by impregnating filamentary structures that were in aquagel condition (after having been salt-spun and wet-stretched) in an with a dissolved aqueous dispersion of the graft copolymer that contained about 1.5 percent polymer solids. The polyacrylonitrile aquagel fiber that was employed had been obtained by extruding a spinning solution of fiber-forming polyacrylonitrile comprised of about 10 parts of the polymer dissolved in 90 parts of a 60 percent aqueous solution of zinc chloride through a spinnerette having 750 individual 6 mil diameter orifices into an aqueous coagulating bath that contained about 43 percent of dissolved zinc chloride to form a multiple filament tow. After being spun, the tow bundle of coagulated polyacrylonitrile aquagel fiber was washed substantially free from salt upon being withdrawn from the coagulating bath and then wet-stretched in three consecutive hot liquid stages for orientation to a total stretched length that was about thirteen times its original extruded length. Each of the hot liquid stages in which the fiber was stretched consisted of a portion of the total mentioned aqueous impregnating bath of the dissolved graft copolymer additive. The first stage had about 1.5 percent of the additive; the second about 0.6 percent; and the last about 0.3 percent. In this way, the fiber became impregnated with the copolymer during its orientation by stretching.

Following the impregnation, the aquagel fiber was irreversibly dried at 150° C. to destroy the waterhydrated structure and convert it to a finished fiber form. The finally obtained 2.7 denier fiber product had a tenacity of about 4.0 grams per denier, an elongation of about 26 percent, a dry yield strength of about 0.96 gram per denier, and a wet yield strength of about 0.82 gram per denier. The copolymer-containing acrylonitrile polymer fiber product was found to have excellent natural stability to heat and light as well as against becoming degraded under the influence of aqueous alkaline media at pH levels as high as 10. It was found to be nearly free of propensity to accumulate charges of static electricity upon handling.

In addition, the graft copolymer-containing sample had good color and hand and was dyeable with all classes of dyestuffs as applied under normal dyeing conditions.

The fiber product dyed well to deep and level shades of coloration with Calcodur Pink 2BL, a direct type of dyestuff (Colour Index Direct Red 75, formerly Colour Index 353) and Sevron Brilliant Red 4G, a basic dye formerly known as Basic Red 4G (Colour Index Basic Red 14).

The dyeing with Calcodur Pink 2BL was performed at the 4 percent level according to conventional procedure in which the fiber sample was maintained for about one hour at the boil in the dye bath which contained the dyestuff in an amount equal to about 4 percent of the weight of the fiber. The dye bath also contained sodium sulfate in an amount equal to about 15 percent of the weight of the fiber and had a bath-to-fiber weight ratio of about 30:1, respectively. After being dyed, the fiber was rinsed thoroughly with water and dried for about 20 minutes at 80° C. The dye-receptivity of the Calcodur Pink 2BL-dyed fiber was then evaluated spectrophotometrically by measuring the amount of monochromatic light having a wave length of about 520 millimicrons from a standard source that was reflected from the dyed sample. A numerical value on an arbitrarily designated scale from zero to one hundred was thereby obtained. This value represented the relative comparison of the amount of light that was reflected from a standard white tile reflector that had a reflectance value of 316 by extrapolation from the 0–100 scale. Lower reflectance values are an indication of better dye-receptivity in the fiber. For example, a reflectance value of about 20 or 25 to 50 or so for acrylonitrile polymer fibers dyed with 4 percent Calcodur Pink 2BL is generally considered by those skilled in the art to be representative of a degree of dye-receptivity that readily meets or exceeds the most rigorous practical requirements and is ordinarily assured of receiving general commercial acceptance and approval. The 4 percent Calcodur Pink 2BL reflectance value of the copolymer-containing fiber product was about 46.

The antistatic properties of the copolymer-containing fiber were then determined by measuring the electrical conductance of the fiber product at various humidities. As is also appreciated by those who are skilled in the art, the basis for such a test is that all fibers have a tendency to generate static electricity upon being handled. Only those that are possessed of sufficient electrical conductance to dissipate the charge as quickly as it forms are not hampered by the bothersome effects of static electricity. Thus, a measure of the electrical conductance of a fiber is a good indication of its ability to dissipate static electricity. The conductivities of the various fiber samples tested were found by determining their electrical resistances. Resistance, of course, is the reciprocal quantity of conductivity. In order to permit various fiber samples to be compared on a common basis, the conductivities of the samples tested were actually measured as volume resistivities according to the following formula:

$$\text{Volume resistivity} = \frac{(\text{Resistance})(\text{Cross-sectional area})}{\text{Path length between electrodes to which sample being tested is attached}}$$

The units of volume resistivity are ohm-cm.$^2$/cm.

Prior to being tested, the graft copolymer-containing polyacrylonitrile fiber prepared in the indicated manner was vat dyed in the conventional manner with Jade Green (Cibanone Brilliant Green BF double paste; Colour Index Vat Green No. 1). Separate portions of the vat dyed sample were then scoured and also subjected to five (5) and ten (10) consecutive No. 3–A accelerated wash tests, respectively, each in accordance with the American Association of Textile Chemists and Colorists (AATCC) Manual. The actual resistivities of the merely vat dyed sample as well as that of the samples that had been both vat dyed and scoured were then determined (after the samples being tested were conditioned for seventy-two hours at the particular temperature and relative humidity conditions involved in each of the tests) by tautly connecting a web-like sample of the yarn between two electrodes, each of which was 9 centimeters long spaced parallel 13 centimeters apart, and across which there was applied a 900 volt direct current potential. For purposes of comparison, the volume resistivities of cotton, wool and an unmodified polyacrylonitrile fiber (obtained in the same way as the copolymer-containing fiber but without having the polymeric additament incorporated therein) were also tested in the indicated manner along with the graft copolymer-containing fiber in accordance with the present invention.

The results are set forth in the following tabulation which indicates the volume resistivities obtained at various relative humidities (R.H.) at 23° C. of each of the samples tested.

Table 1

VOLUME RESISTIVITIES OF VARIOUS FIBER SAMPLES COMPARED TO POLYACRYLONITRILE FIBERS IMPREGNATED WITH GRAFT COPOLYMER OF METHOXY POLYGLYCOL METHACRYLATE MONOMER ON PVP

| Sample | Volume Resistivity, ohm-cm.$^2$/cm. | | | |
|---|---|---|---|---|
| | 32 percent R.H. | 47 percent R.H. | 58 percent R.H. | 66 percent R.H. |
| Graft copolymer-containing fiber as made | $4.4 \times 10^{10}$ | $7.6 \times 10^9$ | $2.8 \times 10^9$ | $1.1 \times 10^9$ |
| Same as scoured | $2.4 \times 10^{11}$ | $4.5 \times 10^{10}$ | $1.4 \times 10^{10}$ | $3.1 \times 10^9$ |
| Same as vat dyed | $2.7 \times 10^{11}$ | $3.3 \times 10^{10}$ | $7.2 \times 10^9$ | $1.7 \times 10^9$ |
| Same as vat dyed and wash tested 5 times | $3.3 \times 10^{11}$ | $3.4 \times 10^{10}$ | $7.1 \times 10^9$ | $1.5 \times 10^9$ |
| Same as vat dyed and wash tested 10 times | $2.8 \times 10^{11}$ | $3.4 \times 10^{10}$ | $1.1 \times 10^{10}$ | $2.6 \times 10^9$ |
| Scoured cotton | $6.4 \times 10^9$ | $2.7 \times 10^8$ | $8.0 \times 10^7$ | $5.4 \times 10^6$ |
| Scoured wool | $5.0 \times 10^{12}$ | $2.7 \times 10^{11}$ | $1.9 \times 10^{10}$ | $3.3 \times 10^9$ |
| Scoured unmodified polyacrylonitrile fiber | $3.0 \times 10^{14}$ | $2.7 \times 10^{13}$ | $5 \times 10^{12}$ | $1.2 \times 10^{12}$ |

As is apparent in the foregoing, the graft copolymer-containing sample, even after being severely scoured, dyed and wash tested was exceptionally durable and had electrical conductance properties much superior to ordinary polyacrylonitrile and only slightly poorer than cotton. At the same time, the physical properties of the graft copolymer-containing fiber were excellent, being about equal to those of the unmodified polyacrylonitrile fiber.

EXAMPLE 7

Following the procedure of the sixth example and using the same monomer as therein employed, the following charge was made to the apparatus.

Monomeric methoxy polyglycol methacrylate _____________________________________grams__ 37.4
PVP (Fikentscher K-value of 45)____________do__ 87.0
Water ____________________________________do__ 486
Ammonium persulfate______________________do__ 0.8
pH (adjusted with HCl)____________________ 5

The reaction mass was maintained for 40 hours at about 50° C. After termination of the reaction, the C=C analysis indicated that about 90 percent of the monomer had been converted to graft copolymer. The graft copolymer product was obtained as a slightly colored, turbid aqueous solution containing about 19.7 percent of polymeric solids. The graft copolymer product contained about 72 percent by weight of PVP and about 28 percent of graft copolymerized substituents from the monomer.

Polyacryonitrile aquagel fibers were impregnated in the manner set forth in Example 6 using about a 1.5 percent aqueous solution of the graft copolymeric product as the impregnating bath in the first of the hot stretch stages; about a 0.6 percent solution in the second; and a 0.3 percent solution in the last stage. After being simultaneously oriented and impregnated with the graft copolymer, the aquagel fiber was dried at about 150° C. It was found to contain about 8.3 percent of the graft copolymeric additament intimately incorporated therein.

The graft copolymer containing fiber had good color, excellent hand and was dyeable with all clases of dyes applied under normal dyeing conditions. Its 4 percent Calcodur Pink 2BL reflectance value was about 21. Its stability to light, heat and alkaline media having a pH as high as 10 were excellent. Its physical properties were as follows:

Denier ___________________________________ 3.1
Tenacity, grams per denier__________________ 4.2
Elongation, percent________________________ 30
Dry yield strength, grams per denier__________ 0.92
Wet yield strength, grams per denier__________ 0.56

The volume resistivities under various conditions of relative humidity at 23° C. of the graft copolymer-containing fiber product were determined in the manner set forth in Example 6 after a portion of the fiber had been scoured. The values found for the graft copolymer-contaning fiber as made were $1.9 \times 10^{11}$ ohm-cm.$^2$/cm. at 58 percent R.H.; and $3.8 \times 10^{10}$ ohm-cm.$^2$/cm. at 66 percent R.H. The values for the scoured fiber samples were $1.3 \times 10^{11}$ ohm-cm.$^2$/cm. at 58 percent R.H.; and $2.4 \times 10^{11}$ ohm-cm.$^2$/cm. at 66 percent R.H. In comparison, similar properties for a similar fiber impregnated only with about the same amount of PVP were about the same as an unmodified polyacrylonitrile fiber, being about $5 \times 10^{12}$ ohm-cm.$^2$/cm. at 58 percent R.H. and about $1.2 \times 10^{12}$ ohm-cm.$^2$/cm. at 66 percent R.H. The superiority and antistatic properties of the graft copolymer-containing fiber, even after severe scouring, is evidenced by comparison of the foregoing volume resistivity values with those obtained under the same conditions for cotton, wool and unmodified polyacrylonitrile fibers as set forth in the preceding Table 1.

EXAMPLE 8

About 1730 grams of 45 percent aqueous solution of PVP (Fikentscher K-value of 55); 8 grams of potassium persulfate and 9551 grams of water were charged into a 12-liter, round bottomed flask equipped with a mechanical agitator. The PVP solution was adjusted to pH 5 with acetic acid and then heated to a temperature of about 75° C. A vacuum of about 15 inches of mercury beneath atmospheric pressure was applied to the reactor and, over a period of about 2 hours, about 2725 grams of a 32.1 percent by weight solution of monomeric methoxy polyglycol methacrylate (obtained as in the second example) in dichloroethane and 7.8 grams of potassium persulfate in 750 ml. of water were added constinuously to the flask under the applied vacuum. Water vapor was removed from the reactor as it was formed. Within 50 minutes after the final addition of monomer had been completed, the temperature in the reactor had risen to about 89° C. At this time the vacuum was removed and a nitrogen sparger and a total reflux condenser were added to the reactor. The reaction mass was then maintained for an additional 5 hour period at 90° C. under the influence of mechanical agitation and continued nitrogen sparging. At the end of this period, a graft copolymeric product was obtained as a light yellow, slightly turbid, slightly viscous aqueous solution having a dissolved solids content of about 15 percent. Bromine analysis of the reaction mass indicated that about 95 percent of the monomer had been converted to graft copolymer product. The graft copolymer product was found to contain about 48.3 percent of PVP and about 51.7 percent of the graft copolymerized monomer substituents. Excellent results were obtained when the polymeric product was incorporated in acrylonitrile polymer fibers as an additive in the manner set forth in the preceding two examples.

EXAMPLE 9

The general procedure of the foregoing three examples was employed to prepare a graft copolymer from the following charge which was polymerized for about 35 hours at a temperature of 50° C.:

Monomeric methoxy polyglycol methacrylate (as in Example 2) _________________________grams__ 30.7
Sodium vinyl benzyl sulfonate_______________do____ 9.9
PVP (K value 45)___________________________do____ 94.8
Water _____________________________milliliters__ 542
Azoisobutyronitrile __________________________grams__ 0.4
PH of charge (adjusted with HCl)_______________ 6

An aqueous solution of a graft copolymer product having mixed graft copolymerized monomer substituents from the different monomers was obtained containing about 11.1 percent solids. The polymeric solution was colorless and only slightly turbid. Conversion of the monomers to graft copolymer was found to be about 95 percent. The graft copolymer product was found to contain about 22 percent of polymerized monomeric methoxy polyglycol methacrylate, about 8 percent of polymerized vinyl benzyl sulfonate and about 70 percent of PVP.

The graft copolymer product was found to be an excellent dye additive and permanent antistatic agent for acrylonitrile polymer fibers when it was incorporated in them in the manner set forth in Example 6 using a 1.5 percent aqueous solution of the polymer product as the impregnating bath in the first of three stages of the hot stretch system; a 0.5 percent solution in the second; and a 0.1 percent solution in the last. The fiber product that was obtained was white in color and had excellent hand. It was found to contain about 4.5 percent on the weight of the fiber of the impregnated graft copolymer. Its physical properties were as follows:

Denier _______________________________________ 2.9
Tenacity, grams per denier____________________ 4.5
Elongation, percent___________________________ 32
Dry yield strength, grams per denier_____________ 1.09
Wet yield strength, grams per denier_____________ 0.90

The graft copolymer-containing fiber product was easily dyeable with all classes of dyestuffs. Its 4 percent Calcodur Pink 2BL reflectance value was about 16. The volume resistivities of the fiber under various conditions of relative humidity after subjecting the fiber sample to a severe scouring were $5.7 \times 10^{11}$ ohm-cm.$^2$/cm. at 32 percent R.H.; $2.6 \times 10^{10}$ ohm-cm.$^2$/cm. at 47 percent R.H.; $3.9 \times 10^9$ ohm-cm.$^2$/cm. at 58 percent R.H. and $1.1 \times 10^9$ ohm-cm.$^2$/cm. at 66 percent R.H.

EXAMPLE 10

The procedure of Example 9 was duplicated excepting to employ the following charge and to conduct the polymerization for 23 hours.

Monomeric methoxy polyglycol methacrylate (from Example 2)_______________________grams__ 30.7
Sodium vinyl benzyl sulfonate_______________do____ 9.9
PVP (K-value 45)___________________________do____ 40.6
Water _____________________________________do____ 375.6
Azobisisobutyronitrile ________________________do____ 0.4
pH of charge (adjusted with HCl)_______________ 6

A light colored, slightly turbid, 6.1 percent solids aqueous solution of the graft copolymer product was obtained. About 84 percent of the monomers had been converted to graft copolymer product which was found to consist of about 34 percent of polymerized methoxy polyglycol methacrylate substituents; 12 percent of polymerized vinyl benzyl sulfonate substituents and 54 percent of PVP.

The graft copolymeric product was impregnated into polyacrylonitrile aquagel fibers in accordance with the foregoing procedure to obtain a graft copolymer-containing fiber in which there was intimately incorporated about 6.3 percent of the graft copolymer additive, based on the weight of the fiber product. The graft copolymer-containing fiber product was white and had an excellent hand. Its denier was 2.8; its tenacity 3.7 grams per denier; its elongation 35 percent; its dry yield strength 1.03 grams per denier; and its wet yield strength 0.89 gram per denier. The fiber product was readily dyeable to deep and level shades of coloration with all classes of dyestuffs. Its Calcodur Pink 2BL reflectance value was 38. It had excellent electrical antistatic properties. After being scoured, its volume resistivities, upon being measured for its electrical conductivity in the foregoing manner, were found to be $3 \times 10^{11}$ ohm-cm.$^2$/cm. at 32 percent R.H.; $9.5 \times 10^9$ ohm-cm.$^2$/cm. at 47 percent R.H.; $2.7 \times 10^9$ ohm-cm.$^2$/cm. at 58 percent R.H.; and $8 \times 10^8$ ohm-cm.$^2$/cm. at 66 percent R.H. Comparison of these values with those obtained under the same conditions for cotton, wool and unmodified polyacrylonitrile fibers as set forth in the preceding Table 1 provides excellent evidence of the superiority of the graft copolymer-containing fiber product as regards its static characteristics.

EXAMPLE 11

The procedure of the foregoing example was repeated with the following charge that was polymerized for 16 hours at 50° C. polymerization temperature.

| | |
|---|---|
| Monomeric methoxy polyglycol methacrylate (from Example 2)_______________________________grams__ | 26.6 |
| 2-sulfo-ethyl methacrylate, sodium salt____do____ | 8.4 |
| PVP (K-value 45)______________________do____ | 81.2 |
| Water _______________________________do____ | 476 |
| Potassium persulfate___________________do____ | 0.7 |
| pH of charge (adjusted with HCl)______________ | 6 |

About 86 percent of the monomers were converted to graft copolymer product. The polymer product was obtained as a light colored, slightly turbid solution in water that contained about 21.5 percent solids.

The polymeric solution obtained was directly impregnated at the boil into polyacrylonitrile aquagel fibers in the three stage hot stretch system described in the foregoing. The fiber product, which contained about 4.7 percent on the weight of the fiber of the graft copolymeric additive, was white and had an excellent hand. Its denier was 2.6; its tenacity was about 4.7 grams per denier; its elongation about 30 percent; its dry yield strength about 1.12 grams per denier; and its wet yield strength about 0.92 gram per denier. The graft copolymer-containing fiber product was readily and easily dyeable with all classes of dyestuffs. Its 4 percent Calcodur Pink 2BL reflectance value was 22. It had excellently low propensity to accumulate charges of static electricity as evidenced by the volume resistivity measurements under various conditions of relative humidity of a scoured sample of the fiber product. These were $1.5 \times 10^{11}$ ohm-cm.$^2$/cm. at 32 percent R.H.; $9.4 \times 10^9$ ohm-cm.$^2$/cm. at 47 percent R.H.; $1.8 \times 10^9$ ohm-cm.$^2$/cm. at 58 percent R.H.; and $6.7 \times 10^8$ ohm-cm.$^2$/cm. at 66 percent R.H., all taken at 23° C.

EXAMPLE 12

The procedure of Example 11 was essentially duplicated excepting to employ the following charge and to conduct the polymerization for 24 hours.

| | |
|---|---|
| Monomeric methoxy polyglycol methacrylate _____________________________grams__ | 26.6 |
| 2-sulfo-ethyl-methacrylate, sodium salt____do____ | 8.4 |
| PVP (K-value of 45)___________________do____ | 35.0 |
| Water _______________________________do____ | 280 |
| Ammonium persulfate__________________do____ | 0.7 |
| pH charge (adjusted with HCl)________________ | 6 |

About 95 percent of the monomers were converted to graft copolymer product containing about 37 percent of polymerized methoxy polyglycol methacrylate; about 12 percent of polymerized 2-sulfoethyl methacrylate units; and about 51 percent of PVP. The polymeric product was obtained from the reaction mass as a slightly colored, turbid viscous solution containing about 22.6 percent of dissolved graft copolymer solids.

Following the procedure of the preceding examples, the graft copolymer solution was directly impregnated at the boil into polyacrylonitrile fibers in the described three stage hot stretch operation. The fiber product was found to contain about 10 percent on the weight of the fiber of the graft copolymeric additive. The graft copolymer-containing fiber product was white in color and had an excellent hand. Its denier was about 2.8, its tenacity about 2.4 grams per denier, its elongation about 25 percent, its dry yield strength about 0.94 gram per denier and its wet yield strength about 0.78 gram per denier. The fiber product could be easily dyed to deep and level shades of coloration with all classes of dyestuffs. Its 4 percent Calcodur Pink 2BL reflectance value was 19. Its antistatic properties and characteristics were excellent, even after scouring, vat dyeing with Jade Green in the manner set forth in Example 6, and vat dyeing following by five (5) No. 3A wash tests. To illustrate, the volume resistivities at 23° C. of the scoured sample were $7.1 \times 10^9$ ohm-cm.$^2$/cm. at 32 percent R.H.; $1.4 \times 10^9$ ohm-cm.$^2$/cm. at 47 percent R.H.; $3.8 \times 10^8$ ohm-cm.$^2$/cm. at 58 percent R.H., and $2.1 \times 10^8$ ohm-cm.$^2$/cm. at 66 percent R.H. The volume resistivities of the vat dyed sample were $7.3 \times 10^{10}$ ohm-cm.$^2$/cm. at 32 percent R.H.; $2 \times 10^9$ ohm-cm.$^2$/cm. at 47 percent R.H.; and $2.3 \times 10^8$ ohm-cm.$^2$/cm. at 58 percent R.H.; and $6.9 \times 10^7$ ohm-cm.$^2$/cm. at 66 percent R.H. Those of the vat dyed and wash tested sample were $1.4 \times 10^{11}$ ohm-cm.$^2$/cm. at 32 percent R.H.; $1.8 \times 10^9$ ohm-cm.$^2$/cm. at 47 percent R.H.; $1.7 \times 10^8$ ohm-cm.$^2$/cm. at 58 percent R.H.; $3.8 \times 10^7$ ohm-cm.$^2$/cm. at 66 percent R.H. As is apparent, even after such severe treatments as scouring, vat dyeing, and vat dyeing plus wash testing, the electrical conductivity of the graft copolymer containing fiber product was superior to that of wool and unmodified polyacrylonitrile fibers, as is evidenced by comparison of the stated values with equivalent values under the same conditions for the wool and polyacrylonitrile fibers that are set forth in Table 1.

EXAMPLE 13

The procedure of Example 12 was repeated to prepare a graft copolymer from about 68.2 grams of the monomeric methoxy polyglycol methacrylate obtained as in Example 2; 20.6 grams sodium styrene sulfonate; 207 grams of PVP having a Fikentscher K-value of about 45; 1081 grams of water, and 1.8 grams of ammonium persulfate. After adjusting the pH of the reaction mass to about 6 with hydrochloric acid, the polymerization was effected at 50° C. during a 28 hour period. The graft copolymer product was obtained as a nearly clear aqueous solution containing about 21 percent of dissolved solids. Ninety-three percent of the monomers had been converted to graft copolymer product which was comprised of about 22 percent of polymerized methoxy polyglycol methacrylate units; 7 percent of polymerized sodium styrene sulfonate; and 71 percent PVP. The graft copolymer solution was impregnated at the boil into polyacrylonitrile aquagel fibers in the three stage hot stretch operation in the manner set forth in the foregoing examples. The graft copolymer-containing fiber product was white and had an excellent hand. The fiber product contained about 6 percent on the weight of the fiber of the graft copolymeric additive. Its denier was about 2.5; its tenacity about 4.4 grams per denier; its elongation about 23 percent; its dry yield strength about 1.1 grams per denier; and its wet yield strength about 0.91 gram per denier. The fiber product was easily and readily dyeable with all classes of dyestuffs. The 4 percent Calcodur Pink 2BL reflectance value of the fiber product was about 29. The volume resistivity at 23° C. of a scoured sample of the fiber was $1.2 \times 10^{13}$ ohm-cm.$^2$/cm. at 32 percent R.H.; $3.9 \times 10^{11}$ ohm-cm.$^2$/cm. at 47 percent R.H.; $3.2 \times 10^{10}$ ohm-cm.$^2$/cm. at 58 percent R.H.; and $5.3 \times 10^9$ ohm-cm.$^2$/cm. at 66 percent R.H. The values of a Jade Green dyed and five (5) times No. 3–A wash tested sample of the fiber product were $1.1 \times 10^{13}$ ohm-cm.$^2$/cm. at 32 percent R.H.; $3.7 \times 10^{11}$ ohm-cm.$^2$/cm. at 47 percent R.H.; $2.6 \times 10^{10}$ ohm-cm.$^2$/cm. at 58 percent R.H. and $2.6 \times 10^9$ ohm-cm.$^2$/cm. at 66 percent R.H.

EXAMPLE 14

The procedure of Example 12 was again duplicated with the following charge excepting to conduct the polymerization for 19 hours at 60° C. and to adjust the pH of the reaction mass to about 5 with hydrochloric acid prior to the polymerization:

| | Grams |
|---|---|
| Monomeric methoxy polyglycol methacrylate | 28.7 |
| Sodium styrene sulfonate | 28.7 |
| PVP (K-value 45) | 37.3 |
| Water | 300 |
| Ammonium persulfate | 0.8 |

A very viscous aqueous solution was obtained containing about 14.1 percent of graft copolymer solids. The graft copolymer product was comprised of about 38 percent of polymerized methoxy polyglycol methacrylate units, 11 percent of polymerized styrene sulfonate units and 53 percent PVP. About 91 percent of the monomers had been converted to graft copolymer product.

Polyacrylonitrile fibers containing about 6 percent on the weight of the fiber of the graft copolymer additive were prepared by impregnating the graft copolymer solution obtained as a product into the fibers during their hot stretching by orientation wherein the polymeric solution was employed at the boil in the simultaneous capacity of a hot stretching medium and an impregnating bath for the fibers. The graft copolymer-containing fiber product had a denier of about 2.7, a dry yield strength of 0.98 gram per denier and a wet yield strength of about 0.83 gram per denier. It could be dyed without difficulty with all classes of dyestuffs to deep and level shades of coloration. Its Calcodur Pink 2BL reflectance value was about 45. The volume resistivities of the scoured graft copolymer containing fiber product at 23° C. were about $1.3 \times 10^{12}$ ohm-cm.$^2$/cm. at 32 percent R.H.; $4.3 \times 10^{10}$ ohm-cm.$^2$/cm. at 47 percent R.H.; $5.2 \times 10^9$ ohm-cm.$^2$/cm. at 58 percent R.H.; and $1.2 \times 10^9$ ohm-cm.$^2$/cm. at 66 percent R.H.

EXAMPLE 15

Into a three-necked, one liter flask that was connected to a source of vacuum and was equipped with a mechanical agitator, there was charged about 200 ml. of water. The water was brought to the boil in the reactor under an applied vacuum of about 27 inches of mercury beneath atmospheric pressure. At this point, about 100 grams of a 32.1 percent solution of monomeric methoxy polyglycol methacrylate (obtained as in the second example) and dichloroethane was added continuously over a 24 minute period into the evacuated reactor. When all of the dichloroethane had been removed by distillation, as indicated by a nearly clear condition in the aqueous solution in the reactor, the vacuum was disconnected and about 30.3 grams of 98.7 percent pure sodium styrene sulfonate was added to the flask along with about 1.0 gram of potassium persulfate and 200 mls. of isopropanol. At this point, a nitrogen sparger tube and a total reflux condenser were installed on the flask. Another 100 ml. portion of water was then added to the reaction mass. The mass in the reactor was then maintained at the reflux temperature of 85° C. for a 24 hour period. At the end of this period, a clear, light yellow solution was obtained in the flask as the reaction mass. The alcohol-water azeotrope was then removed from the reaction mass as indicated by the vapor temperature reaching the boiling point of water (47.5° C.) under an applied vacuum of about 27 inches of mercury beneath atmospheric pressure. The final product obtained was a light yellow, slightly turbid aqueous solution of a "straight" copolymer of the methoxy polyglycol methacrylate and styrene sulfonate. The copolymer solution weighed about 320 grams and contained about 26 percent of dissolved copolymer solids. Upon analysis, it was found that essentially 100 percent conversion of the monomers to copolymer product was obtained. The copolymer, upon being dried to a solid, was a light yellow, waxy, non-crystalline material that decomposed before melting. When the copolymer product is incorporated in polyacrylonitrile fibers in the manner set forth in the preceding examples, excellent results are obtained with respect to the improvement in its antistatic characteristics.

EXAMPLE 16

About 500 grams of a 32.1 percent solution in dichloroethane of monomeric methoxy polyglycol methacrylate (obtained as in the second example) and 1.0 gram of benzoyl peroxide were charged into a 3-necked, one-liter flask that was equipped with a mechanical agitator, a total reflux condenser and a nitrogen sparging unit. Under a nitrogen blanket and with continued agitation, the reaction mass was maintained at 72° C. for a 24 hour period. The homopolymeric product was obtained as a slightly viscous, light yellow, clear solution containing about 29.2 percent of the dissolved polymer solids. Upon analysis, about 91 percent of the monomer was found to have been converted to homopolymer product. Suitable results are obtained when the homopolymer is employed as an additive for acrylonitrile polymer fibers in the foregoing described manner.

EXAMPLE 17

About 70 grams, on a dry weight basis, of a polyacrylonitrile aquagel that had been oriented by stretching to a total length of about 13 times its original extruded length was immersed for about 20 hours in about 2 liters of a 1.5 percent aqueous solution of a similar copolymeric product to that described in Example 6 with the exception that the graft copolymer had been prepared with PVP having a Fikentscher K-value of about 30. After the impregnation, the aquagel fiber was removed from the impregnating bath, washed three times with distilled water, and subsequently dried at 140° C., the resulting fiber product, which contained about 5 percent of the impregnated graft copolymeric additive, was white and had a soft and attractive hand. It was found to have good receptivity of practically all classes of dyestuffs excepting that its acceptance of basic dyestuffs was relatively poor in comparison to the graft copolymer-containing fiber products containing polymerized sulfonic acid groups illustrated in the preceding examples. The 4 percent Calcodur Pink 2BL reflectance value of the graft copolymer-containing fiber product was 45. The volume resistivities of the graft copolymeric additive containing fiber product as made, measured at 23° C., were $1 \times 10^{12}$ ohm-cm.$^2$/cm. at 32 percent R.H.; $2.1 \times 10^{11}$ ohm-cm.$^2$/cm. at 47 percent R.H.; $5.3 \times 10^{10}$ ohm-cm.$^2$/cm. at 58 percent R.H.; and $9.2 \times 10^9$ ohm-cm.$^2$/cm. at 66 percent R.H. A Jade Green vat dyed sample of the graft copolymer-containing fiber product had a volume resistivity at 32 percent R.H. of $3.6 \times 10^{12}$ ohm-cm.$^2$/cm. At 47 percent R.H., its volume resistivity was $3.2 \times 10^{11}$ ohm-cm.$^2$/cm.; at 58 percent R.H., it was $2.7 \times 10^{10}$ ohm-cm.$^2$/cm.; and at 66 percent R.H., it was $3.9 \times 10^9$ ohm-cm.$^2$/cm. A Jade Green vat dyed sample of the same fiber product that had been subjected to five (5) No. 3–A wash tests had a volume resistivity of $1.7 \times 10^{12}$ ohm-cm.$^2$/cm. at 32 percent R.H. while its volume resistivities at 47, 58 and 66 percent R.H. were $3 \times 10^{10}$; $1.7 \times 10^9$; and $3.8 \times 10^8$ ohm-cm.$^2$/cm.; respectively.

EXAMPLE 18

When the procedures of Examples 6 through 17 are repeated excepting to employ the monomer of Example 3 for the preparation of various polymer products, similar excellent results are obtained.

EXAMPLE 19

Into a one liter round bottom flask that was equipped with a mechanical agitator, a nitrogen sparge tube, and a packed fractionating column, the following charge was made:

| | Grams |
|---|---|
| Polyethylene glycol monomethyl ether having an average weight of about 900 | 200 |
| Methyl methacrylate | 200 |
| Para-toluene sulfonic acid | 13.8 |
| $CuSO_4 \cdot 5H_2O$ | 13 |

The fractionating column had an interior diameter of about 25 mm. and was packed to a depth of about 24 inches with 8 x 8 mm. glass Raschig rings. The fractionating column was also equipped with a condenser and an automatic take-off head that was capable of being set to any desirable reflux ratio. Nitrogen was bubbled through the reactor. Agitation was commenced at the same time.

Heating of the reactor was begun by means of an electric heating mantle around the reactor. Within a period of 25 minutes, vapor was observed at the top of the fractionating column. The column was operated on total reflux for about 40 minutes until the overhead temperature therein dropped to about 25° C. This temperature indicated that a vaporized mixture of about 35 percent methyl methacrylate and 65 percent methanol was passing through the column. At this period, the automatic take-off heat was set for 5 percent removal of the condensate. With the column set to operate at this reflux ratio, the overhead temperature was found to remain fairly constant. After about 2 hours of additional operation, the overhead temperature in the fractionating column started to rise steadily. When the overhead temperature reached about 35° C., heating of the reactor was discontinued. After this, the reaction mass was permitted to cool for about one hour, whereupon the toluene sulfonic acid therein was neutralized with about 15.0 grams of sodium acetate. About 200 ml. of water was then added to the reaction mass and heating was resumed. At this point, steam was also introduced into the reactor in order to strip the unreacted methyl methacrylate from the reaction mass. The steam stripping was continued until no methyl methacrylate could be visually observed as a separate phase in the distillate.

After steam stripping, the reaction mass was obtained as a clear green solution with some polymer solids therein; occurring in the form of small round beads. These polymer solids were easily filtered from the reaction mass to yield about 668 grams of a clear, green, aqueous solution of the reaction products (containing the monomeric product methoxy polyglycol methyl ether; unreacted polyglycol monomethyl ether; copper sulfate and neutralized toluene sulfonic acid). The filtrate, upon bromination analysis, was found to contain about 0.28 mole per kilogram of C=C. This indicated that about an 85 percent conversion had been obtained of the starting monomethyl polyglycol ether to desired monomeric product.

The 668 grams of aqueous monomer solution was extracted with about an equal weight of 1,2-dichloroethane as an extracting solvent. A separatory funnel was employed for the extraction of the monomer rich aqueous layer. This was mixed thoroughly with extraction solvent by shaking. After mixing, the separatory funnel was placed in a cold room (maintained at a temperature of about 18° C.) in which it was permitted to remain for about a 16 hour period. At the end of this period, it was found that 2 sharp layers had formed in the separatory funnel. The upper, aqueous layer was light green in color. The lower oleaginous layer was clear and light brown in color. When separately removed from the funnel, a dichloroethane layer was found to weigh about 140 grams and to contain about 0.18 mole per kilogram of C=C upon bromination analysis. This indicated that about 80 percent of the monomer had been recovered from the aqueous reaction mass by the single extraction with dichloroethane.

About 200 grams of the monomer rich, dichloroethane extractant solution was inhibited with about 0.08 gram of hydroquinone and evaporated at 28° C. under a pressure of about 25 mm. of mercury for 48 hours. About 35.8 grams of isolated residue remained after the evaporation of dichloroethane extracting solvent. The residue was found to contain about 0.99 mole of C=C per kilogram, indicating that substantially pure monomer products had been recovered. The thereby isolated monomer product had a melting point of about 26° C. and, in its normally solid form, was light tan in color. The monomer formed clear water white aqueous solutions at 10 percent concentration. When the monomer itself was heated, it was observed to homopolymerize before boiling.

A homopolymer of the recovered monomer products was made by dissolving about 3 grams of an isolated solid monomer in 97 ml. of water and adding about 0.1 ml. of 30 percent hydrogen peroxide catalyst to the solution; after which the catalyzed solution was maintained at 50° C. for about 24 hours. At the end of this period, bromination analysis for unsaturation indicated that more than 90 percent of the monomer had been converted to a homopolymeric product. The aqueous solution of the polymer product was slightly viscous, clear, and water white in color.

Good results are obtained when the homopolymer is employed as an additive for acrylonitrile polymer fibers in the foregoing manner, using the directly obtained aqueous solution of the homopolymer as an impregnating bath for the fibers in aquagel condition. The antistatic characteristics of the homopolymer-containing fiber products are found to be substantially improved in comparison with unmodified polyacrylonitrile fibers.

EXAMPLE 20

The procedure for Example 19 was substantially duplicated, using the same apparatus excepting to employ about 250 grams of a polyethylene glycol monomethyl ether having an average molecular weight of about 350 in the charged reaction mass; along with about 250 grams of methyl methacrylate; and 12.5 grams each of the para-toluene sulfonic acid and the copper sulfate. Vapor was observed at the top of the fractionating column within 20 minutes after commencement of heating, after which the column was operated on total reflux for about 2 hours. After the total reflux period had expired, a reflux ratio was set in the column so that about 10 percent removal of condensate was effected.

About 555 grams of filtered aqueous reaction mass was obtained after the unreacted methyl methacrylate monomer had been removed by steam distillation. Analysis of the filtrate indicated that about 0.965 mole per kilogram of C=C were prepared in the reaction mass, corresponding to about 75 percent conversion of the polyglycol monomethyl ether to monomeric products.

The reaction mass was extracted with 1,2-dichloroethane in the same manner described in Example 19. The finally obtained dichloroethane layer weighed about 725 grams. It was found to contain about 0.54 mole per kilogram of C=C. This indicated that about 73 percent of the monomer product had been recovered in the single extraction operation.

The monomer-containing, dichloroethane extracting solvent was evaporated in the same way as set forth in Example 19, excepting to use about 0.09 gram of hydroquinone for inhibiting purposes. About 23.5 grams of residue was obtained. The residue was found to consist of about 2.37 moles per kilogram of C=C. The monomer product was liquid at normal room temperatures. It was light tan in color and formed a hazy solution in water at 10 percent concentration. The liquid monomer was also found to polymerize before reaching its boiling point.

Homopolymers of the monomeric product were prepared in the same way as set forth in Example 19. More than 90 percent of the monomer was converted to homopolymeric product which was found to provide good results for anti-static purposes when incorporated in polyacrylonitrile fibers in the manner described in the foregoing examples.

Excellent results may also be obtained when the foregoing is repeated to prepare and employ as additives other high polymers of the monomeric polyglycol monoesters of Formula I that are within the scope of the present invention as well as other copolymers of the monomeric polyglycol monoesters of the same formula with the various organic sulfonic acid and derivative monomers disclosed and other graft copolymers on vinyl lactam polymers of other monomeric polyglycol monoesters of Formula I employed separately for the preparation of the graft copolymeric products or in monomeric mixtures with one or more of any of the monomeric vinyl group-containing organic sulfonic acid compounds of the Formulae II, III, IV, V and VI.

Excellent results may likewise be obtained when the foregoing is repeated to prepare graft copolymer additives from poly-N-vinylcaprolactam, poly-N-vinyl-5-methyl-2-pyrrolidone, poly-N-vinyl-piperidone and other vinyl lactam polymers. Results similar to those set forth in the foregoing can similarly be obtained when any of the indicated varieties of polymeric additaments, including homopolymers, copolymers and graft copolymers, are incorporated in polyacrylonitrile and other acrylonitrile polymer fibers to provide articles in accordance with the present invention by blending the graft polymeric additaments and the fiber-containing acrylonitrile polymer in a spinning composition or dope prior to its extrusion into filamentary products by either wet spinning or dry spinning techniques. In such instances, incidentally, it may be desirable, in order to secure optimum benefit in the practice of the invention, to employ relatively larger quantities of the polymeric additament than when surface impregnation is performed so that the presence of effective quantities of the additament at or near the peripheral portion of the article is assured.

The monomeric polyglycol monoester compounds of Formula I that are used for the preparation of polymeric additives in the practice of the present invention are generally relatively non-volatile, clear or lightly colored liquids that have the above-indicated generic structure. Besides being soluble in water, such monomers, as has been indicated, are also soluble in alcohols, chlorinated hydrocarbons and other organic solvents, including ketones, ethers such as diethyl ether, amides, amines, dimethyl formamide and the like. Ordinarily the monomers are not particularly soluble in such liquids as straight hydrocarbon solvents.

The monomeric polyblycol monoester compounds of Formula I that are used in the preparation of polymeric additament products in the practice of the present invention may, as has been demonstrated, be prepared by a method which involves condensing an alkyl acrylate or methacrylate with a polyglycol that has a non-reactive terminal end group (or, as may otherwise be stated, has but a single reactive hydroxyl group in its constitution). Preferably, a lower alkyl acrylate or methacrylate is employed such as one in which the alkyl unit contains not more than 4 carbon atoms. The preparation of such monomers may be typified by the following reaction between methyl methacrylate and a polyethylene glycol monomethyl ether.

Advantageously, the condensation reaction is accomplished in the presence of an acid catalyst (such as para-toluene sulfonic acid) and a polymerization inhibitor (such as hydroquinone) in order to avoid premature polymerization of the monomer. Generally, an amount of the catalyst up to about 10 percent by weight, based on the weight of the reactants, may be required for the accomplishment of the condensation. Frequently, only 5 percent or less of the catalyst is needed. Usually relatively greater quantities of the catalyst are necessary to employ when the reaction is performed by batchwise techniques instead of according to continuous processing arrangements. Other catalysts that may be employed include sulfuric acid, phosphoric acid and the like. If desired, the monomer-preparing reaction may be conducted in a suitable solvent vehicle, such as benzene, toluene, ethylene dichloride or carbon tetrachloride. The reaction may be performed with benefit at temperatures from about 60 to 140° C., depending on the particular solvent employed. Better results in the preparation of the monomer may often be obtained when the temperature is maintained between about 90 and 120° C. The monomeric polyglycol monoester-preparing reaction will occur under any desired pressure. It is generally convenient for it to be conducted under reflux conditions. Ordinarily, food conversions and yields of desired product from the converted starting materials (including 100 percent conversions) can be realized within reaction periods of 20 hours or less. By way of illustration, conversions in the neighborhood of 90 percent or greater of the reactant materials to the desired monomer are not unusual. For many purposes, such as and particularly when the monomer is desired to be converted into polymer products, it is generally unnecessary to isolate the monomer from the reaction mass in which it was prepared. This is for the reason that it can be readily obtained in the reaction mass in a condition in which it is free from interfering impurities by the expedient of removing the unused alkyl acrylate starting material and any polymerization inhibitor that may have been employed. As is apparent, the monomeric polyglycol monoester compounds used in the practice of the present invention may advantageously be prepared from particular varieties of polyethylene glycols although, if desired, beneficial results may be obtained when they are manufactured from polyglycols of a similar type that are comprised of mixtures of oxyethylene and oxypropylene units.

Besides those specifically illustrated herein and included in the Formulae II, III, IV, V and VI, other organic sulfonic acids and derivative monomers may also be utilized for the preparation of the copolymers and graft copolymers of the present invention such, by way of illustration, as those which are set forth in the disclosure of United States Letters Patent Number 2,527,300. In addition to the polymeric products specifically described in the foregoing examples, other useful polymeric additaments may advantageously be prepared with the monomeric polyglycol monoesters of Formula I with such organic sulfonic acids as 2-propene sulfonic acid; sodium para-vinylbenzene sulfonate; 2- and/or 3-sulfopropyl acrylate; α-sulfoacrylic acid; sodium vinyl toluene sulfonate; potassium ortho-chlorostyrene sulfonate; 2-hydroxy-3-sulfopropyl acrylate; sodium salt; sodium 3-allyloxyl-2-hydroxypropane sulfonate; 4-sulfophenyl acrylate, sodium salt; N-allyl imino di-(2-ethane sulfonic acid); and the like, or with mixtures of such monomers graft copolymerized upon various vinyl lactam polymers.

Still other organic sulfonic acids and derivative monomers that may be employed are as set forth in the following representative (but by no means exhaustive) listing, wherein they are grouped according to the several types indicated in the foregoing specification.

Aromatic alkenyl group-containing sulfonic acid compounds (Formula II):
 Para-styrene sulfonic acid
 Ortho-styrene sulfonic acid
 Para-isopropenyl benzene sulfonic acid Para-vinyl benzyl sulfonic acid
Ortho-isopropenyl benzyl sulfonic acid
Sodium para-styrene sulfonate
Potassium ortho-styrene sulfonate
Methyl para-styrene sulfonate
Ethyl para-vinyl benzyl sulfonate
Ortho-vinyl benzene sulfonic acid
Isopropyl ortho-isopropenyl benzene sulfonate
n-Butyl ortho-styrene sulfonate
Tertiary butyl para-styrene sulfonate
2-chloro-4-vinyl benzene sulfonic acid
4-bromo-2-isopropenyl benzene sulfonic acid
3-vinyl toluene 6-sulfonic acid, sodium salt
2-ethyl-4-vinyl benzene sulfonic acid
2,3-dichloro-4-vinyl benzene sulfonic acid
2,3,5-tribromo-4-vinyl benzene sulfonic acid
2-chloro-3-vinyl-toluene-6-sulfonic acid
2,3-diethyl-4-vinyl-benzyl sulfonate, sodium salt Alkenyl sulfonic acid compounds (Formula III):
  Ethylene sulfonic acid
  Sodium ethylene sulfonate
  Potassium ethylene sulfonate
  Methyl ethylene sulfonate
  Isopropyl ethylene sulfonate
  1-propene 3-sulfonic acid
  1-propene 1-sulfonic acid, sodium salt
  1-propene 2-sulfonic acid, ethyl ester
  1-butylene 4-sulfonic acid, n-butyl ester
  1-butylene 3-sulfonic acid
  Tertiary butylene sulfonic acid Sulfoalkylacrylate compounds (Formula IV):
  Sulfomethylacrylate
  2-sulfoethylacrylate
  Sulfomethylmethacrylate, sodium salt
  2-sulfoethylmethacrylate, methyl ester
  2-sulfoethylmethacrylate, potassium salt Acryloyl taurine and homologous compounds (Formula V):
  N-acryloyl taurine
  N-acryloyl taurine, sodium salt
  N-methacryloyl taurine, methyl ester
  N-methacryloyl taurine, potassium salt
  N-acryloyl taurine, ethyl ester
  N-acryloyl-aminomethane sulfonic acid
  N-methacryloyl-aminomethane sulfonic acid, sodium salt
  Methyl N-methacryloyl-aminomethane sulfonate Allyl taurine and homologous compounds (Formula VI):
  Allyl taurine
  Allyl taurine, sodium salt
  Allyl taurine, potassium salt
  Methallyl taurine
  Methallyl taurine, methyl ester
  Methallyl taurine, isopropyl ester
  N-allyl-aminomethane sulfonic acid
  Sodium N-allyl-aminomethane sulfonate
  Lithium N-methallyl-aminomethane sulfonate
  n-Butyl N-allyl-aminomethane sulfonate The vinyl lactam polymers that are utilized in the preparation of the graft copolymeric additaments of the present invention may be any of those (or their mixtures) which are variously characterized and generically known to the art as poly-N-vinyl lactams or poly-1-vinyl lactams. Such polymers as have been described or which may be prepared from the mentioned varieties of monomers that are involved in U.S. Patents Nos. 2,265,450; 2,371,804; and 2,335,454 may be suitably employed in the practice of the invention. Advantageously, the poly-N-vinyl lactam that is used for the manufacture of the graft copolymer may be one having a Fikentscher K-value between about 30 and 55. Beneficially, as has been indicated, the poly-N-vinyl lactams that are employed are poly-N-vinylpyrrolidone, poly-N-vinylpiperidone, poly-5-methyl-N-vinyl-2-pyrrolidone, or poly-N-vinylcaprolactam, particularly poly-N-vinylpyrrolidone.

The monomeric polyglycol monoesters of the Formula I that are employed in the practice of the present invention will undergo polymerization in mass (which is oftentimes referred to as "bulk polymerization") as well as polymerization in aqueous or other solution or in emulsion or other dispersion in liquids in which the monomer is insoluble or immiscible in order to form the homopolymeric additives that may be used for blending in the acrylonitrile polymer compositions. It is ordinarily beneficial for such homopolymerization to be conducted at a temperature between about 50 and 90° C. Suitable catalysts or initiators for homopolymerization of the monomer of Formula I include the azo catalysts, such as azo-bisisobutyronitrile, peroxygen catalysts, such as potassium persulfate, the various known redox systems and irradiation under the influence of high energy fields. The latter catalyzation may include the various, diverse actinic radiations, such as ultraviolet, X-ray and gamma radiations, as well as radiations from radioactive materials, such as cobalt-60 and the like. The monomeric polyglycol monoesters will also undergo thermal polymerization without using catalyzing agents by simply heating them in air at a temperature of 60° C. or so.

The homopolymers of the monomeric polyglycol monoesters of Formula I may advantageously be prepared as high polymers having a molecular weight in the range from, say, 6 to 600 thousand and higher. Of course, lower molecular weight polymers can also be made. The solid polymer products are generally hygroscopic, viscous liquids to solids having a non-crystalline nature as indicated by X-ray analysis. They ordinarily fuse at relatively low temperatures. Infrared and ultraviolet analysis of the polymeric products of the monomeric polyglycol monoesters of Formula I, including homopolymers, copolymers and graft copolymers, both produce spectra conforming to an expectable pattern.

The copolymers and graft copolymers of the present invention may generally be prepared by methods of polymerization, such as those which have been demonstrated in the foregoing illustrative examples, that employ such polymerization catalysts as have been mentioned in the foregoing in connection with the homopolymerization of the Formula I. High energy irradiation, simple heating or evaporation of the monomer-containing polymerization mixture may oftentimes be resorted to with advantage for preparation of the graft copolymers. Both the copolymers and the graft copolymers may be prepared in either aqueous or organic solvent vehicles using temperatures for the desired polymerization that may vary from about room temperature to the boiling point of the polymerization mixture. It is ordinarily satisfactory to conduct the reaction at a temperature of about 50 to 80 or 100° C. Usually, depending on the specific factors that may be involved, the copolymerization or graft copolymerization may be accomplished satisfactorily within a time period of about 10 to 60 hours.

Compositions of conventional copolymeric additaments in accordance with the present invention can vary within rather wide limits. The content of either monomeric constituent may advantageously be between about 20 and 80 mole percent. In many cases, especially to secure optimum dye-receptivity with conventional copolymeric additaments, nearly equivalent or about commensurate or equimolar proportions of both the monomeric acrylate and methacrylate polyglycol monoester and the monomeric vinyl group-containing organic sulfonic acid may be employed with great benefit for the preparation of the copolymeric additaments.

Similarly, the compositions of the graft copolymers of the present invention can also vary within rather wide limits. When only the monomeric acrylate or methacrylate polyglycol monoester is utilized in the preparation of the graft copolymers, it is advantageous for the content of the monomer that is graft polymerized on the vinyl lactam polymer to be between about 10 and 80 percent by weight of the resulting graft copolymer product. More advantageously, between about 30 and 60 percent by weight of the graft copolymer product may be comprised of substituents from the graft copolymerized monomer. In many cases, especially to secure optimum dye-receptivity, nearly equivalent or about commensurate or equal weight proportions of the vinyl lactam polymer and the monomeric constituent graft copolymerized thereto may be employed with benefit for the preparation of the graft copolymeric additaments. When graft copolymeric products are prepared from mixtures of the monomeric acrylate or methacrylate polyglycol monoesters and the monomeric organic sulfonic acid compounds, it is also desirable for the content of graft copolymerized monomeric constituents to be about 10 and 80 percent by weight, more advantageously between about 30 and 60 percent by weight, of the resulting graft copolymer product. It is also usually desirable in the instances where mixed monomers are graft copolymerized for about commensurate weight proportions of the vinyl lactam polymer and the monomeric constituent graft copolymerized thereto to be obtained in the graft copolymeric product. When mixtures of monomers are employed for preparing the graft copolymeric product, it is advantageous for from about 10 to 90 mole percent of the mixture of monomers to be comprised of the monomeric acrylate or methacrylate polyglycol monoester. It is generally more desirable and of greater advantage in such instances for the mixtures of monomers that are utilized to prepare the graft copolymer to be comprised of from 30 to 60 mole percent of the monomeric polyglycol monoester.

The polymerization system that is employed for the preparation of any of the polymeric products of the present invention may consist of as much as 50 percent by weight of the mixture polymerizable ingredients (either monomeric or combinations of monomers and vinyl lactam polymers) to be polymerized in the aqueous or other medium. The amount of polymerizable constituents that are provided in the graft polymerization system may be influenced somewhat by the manner in which it is intended to incorporate the product in the synthetic polymer compositions in order to provide the polymer-containing acrylonitrile polymer compositions of the invention.

If, for example, it is intended to incorporate the polymer product by blending into a fiber-forming composition prior to its fabrication into shaped articles, the polymerization system may, if desired, contain about equal proportions by weight of the charged polymerizing constituents and the polymerization medium which, preferably, is miscible with and tolerable in the spinning solution solvent intended to be used. In such cases, the polymer product may ordinarily be readily isolated from unreacted monomer and directly incorporated in the fiber-forming composition. If the incorporation of the polymeric additive in a fiber-forming composition is to be achieved by impregnation therewith of an already-formed shaped article of the composition, it may be desirable to effect the copolymerization so as to directly form a suitable applicating solution (or suspension in the cases where a non-solvent polymerization vehicle is employed) of the polymeric additament product. For such purposes, the polymerization system may be prepared to contain as little as 5 or 10 percent by weight of the polymerizing ingredients. Such a method for preparing the polymeric products may be especially appropriate when they are intended, in the practice of the present invention, to be applied to acrylonitrile polymer fibers and the like that are derived from aquagels in the course of their manufacture, such as acrylonitrile polymer fibers that are wet spun from aqueous saline solutions of the fiber-forming polymer.

In such instances, as has been demonstrated, the polymeric additament may be impregnated into the fiber from aqueous solution while the fiber is in a swollen or gel condition, as a polyacrylonitrile fiber in an aquagel condition, in order to obtain the desired polymer-containing product.

If desired, the polymer-containing acrylonitrile polymer compositions may comprise as much as 20 or more percent by weight of the graft copolymeric additament, based on the weight of the composition. Usually, however, suitable properties and characteristics and better fiber-forming properties in a given composition may be achieved when lesser proportions of the polymeric additament are incorporated therein. An appreciable improvement in dye-receptivity, antistatic properties and stability may frequently be obtained when a quantity of the polymeric additament that is as small as 2 (and even as low as 1 or less) percent by weight is employed. Advantageously, an amount between about 5 and 12 percent by weight of the polymeric additament may thus be utilized in the composition. Greater advantages may often accrue when the amount of the polymeric additament that is incorporated in the composition is in the neighborhood of 6–10 percent by weight, based on the weight of the composition.

As has been indicated, the polymeric additaments may be incorporated in the acrylonitrile polymer compositions according to various techniques. Thus, for example, the polymeric additament and the acrylonitrile polymer may be directly blended in order to provide the composition which, incidentally, may be used for any desired fabrication purpose in addition to fiber-forming and the like. Beneficially, the polymeric additives and the acrylonitrile polymers may be comminuted, either separately or in combination, before being intimately blended together by mechanical or other means. The blended polymers may be prepared into suitable fiber-forming system by dissolving or otherwise dispersing them in a suitable liquid medium. Or, the compositions may be provided in fiber-forming system by sequentially dispersing the diverse polymers in any desired order in a suitable medium, as by incorporating the polymeric additament in a prepared acrylonitrile polymer spinning solution, dope or the like.

As is evident from the illustrative examples heretofore included, a highly advantageous technique for providing the compositions, particularly when acrylonitrile polymer fibers products are involved, is to apply or impregnate the polymeric additament from a dissolved aqueous dispersion thereof to a shaped acrylonitrile polymer article that is in an aquagel condition in a manner similar and analogous to that employed for the impregnation of vinyl lactam polymers as described in the disclosure contained in the copending application of George W. Stanton, Theodore B. Lefferdink, Richard W. Meikle and Mary J. Charlesworth for a "Method and Composition for Rendering Polyacrylonitrile Readily Dyeable," having Serial No. 333,385, which was filed on January 26, 1953, now abandoned. Thus, an acrylonitrile polymer filamentary article that has been spun from an aqueous saline solution may be conveniently passed, after its coagulation and while it is in an aquagel condition, through a water bath containing the dissolved polymeric additament in order to impregnate the filament with the polymer product and provide a composition and an article in accordance with the invention. In addition, if desired, in situ polymerization techniques may also be relied upon to provide certain forms of the polymeric additament in the acrylonitrile polymers in either fabricated or unfabricated form.

The compositions of the invention may advantageously be utilized in or with fiber-forming systems of any desired type in order to provide fibers and the like according to procedures and techniques that are conventionally employed for such purposes in the preparation of fibers and such related shaped articles as filaments, strands, yarns, tows, threads, cords and other funicular structures, ribbon, tapes, films, foils, sheets and the like which may be manufactured from synthetic polymeric materials. It is frequently desirable to employ concentrated solutions of salts or mixtures of salts as the dispersing or dissolving media for such purposes. Such solutions may, as has been indicated, contain at least about 55 percent by weight, based on the weight of the solution, of zinc chloride or other known saline solvents for the polymer. Acrylonitrile polymer fiber products that are spun from saline fiber-forming systems may, by way of further illustration, be coagulated in more dilute saline solutions of a like or similar nature and may then be processed after coagulation according to conventional techniques of washing, stretching, drying, finishing and the like with the modification of the present invention being accomplished prior or subsequent to the spinning as may be desired and suitable in particular instances.

The modified and polymer additive-containing acrylonitrile polymer fiber products in accordance with the present invention (one of which is schematically illustrated in the sole FIGURE of the accompanying drawing) have excellent physical properties and other desirable characteristics for a textile material and have a high capacity for and are readily and satisfactorily dyeable to deep and level shades with any of a wide variety of dyestuffs. For example, they may be easily and successfully dyed according to conventional procedures using acid, vat, acetate, direct, naphthol and sulfur dyes. Such dyestuffs, by way of didactic illustration, as Calcocid Alizarine Violet (Colour Index 61710, formerly Colour Index 1080), Sulfanthrene Red 3B (Colour Index Vat Violet ), Amacel Scarlet GB (Colour Index 11110—also known as Amacel Scarlet BS, and having American Prototype Number 244), Calcodur Pink 2BL (Colour Index 353, also more recently, Colour Index Direct Red 75), Naphthol ASMX (Colour Index 35527), Fast Red TRN Salt (Colour Index Azoid Diazo Component 11), and Immedial Bordeaux G (Colour Index Sulfur Brown 12) may advantageously be employed for such purposes.

Other dyestuffs, by way of further illustration, that may be utilized beneficially on the graft copolymer-containing, polymer blended fiber products of the invention include such direct cotton dyes as Chlorantine Fast Green 5BLL (Colour Index Direct Green 27), Chlorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2R (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo Yellow G Extra (Colour Index Acid Yellow 63); such mordant-acid dyes as Alizarine Light Green GS (Colour Index Acid Green 25); such basic dyes as Brilliant Green Crystals (Colour Index Basic Green 1) and Rhodamine B Extra S (Colour Index Vat Blue 35); such vat dyestuffs as Midland Vat Blue R Powder (Colour Index Vat Blue 35), Sulfanthrene Brown G Paste (Colour Index Vat Brown 5), Sulfanthrene Blue 2B Dbl. paste (Colour Index Vat Blue 5), and Sulfanthrene Red 3B paste (Colour Index Vat Violet 2); various soluble vat dyestuffs; such acetate dyes as Celliton Fast Brown 3RA Extra CF (Colour Index Dispersed Red 13), Artisil Direct Red 3BP and Celanthrene Red 3BN Conc. (Both Colour Index Dispersed Red 15), Celanthrene Pure Blue BRS 400 percent (Colour Index Dispersed Blue 1) and Acetamine Yellow N (Colour Index Dispersed Yellow 32); B-Naphthol←2-chloro-4-nitroaniline, an azoic dye; such sulfur dyes as Katigen Brilliant Blue GGC High Conc. (Colour Index Sulf. Blue 9) and Indo Carbon CLGS (Colour Index Sulf. Blue 6); and various premetallized dyestuffs.

The dyed products are generally lightfast and stable to heat and are well imbued with a good resistance to crocking. In addition, the dyed products exhibit good washfastness and retain the dye-assisting copolymeric additament in a substantially permanent manner, despite repeated exposure and subjection to washing, laundering and dry cleaning treatments.

What is claimed is:

1. A copolymer containing as essential ingredients of its molecular structure between about 20 and 80 mole percent of (a) a polymerized polyglycol monoester of the formula:

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and (b) from 80 to 20 mole percent of at least one polymerized alkenyl group-containing organic sulfonic acid compound selected from the group consisting of those represented by the formulae:

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; $p$ is an integer from 0 to 1; and $r$ is an integer from 1 to 4.

2. The copolymer of claim 1 containing about equal mole proportions of each of the indicated varieties of monomers polymerized in the copolymer structure.

3. A graft copolymer comprising between about 10 and 80 percent by weight of (a) a polyglycol monoester of the formula:

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and (b) from 90 to 20 percent by weight of a vinyl lactam polymer.

4. The graft copolymer of claim 3 containing in the polymer molecule between about 30 and 60 percent by weight of said polyglycol monoester graft copolymerized with the vinyl lactam polymer.

5. The graft copolymer of claim 3, wherein said vinyl lactam polymer with which the monomeric polyglycol monoester is graft copolymerized is poly-N-vinylpyrrolidone.

6. Graft copolymer comprising between about 10 and 80 percent by weight of (a) a mixture of monomers consisting of (1) from about 10 to 90 mole percent of a polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and (2) from about 90 to 10 mole percent of at least one alkenyl group-containing organic sulfonic acid compound selected from the group consisting of those represented by the formulae:

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) from about 90 to 20 percent by weight of a vinyl lactam polymer.

7. The graft copolymer of claim 6 containing in the polymer molecule between about 30 and 60 percent by weight of said mixture of monomers copolymerized with the vinyl lactam polymer.

8. The graft copolymer of claim 6, wherein said mixture of monomers comprises from about 30 to 60 mole percent of said polyglycol monoester of the formula (I).

9. The graft copolymer of claim 6, wherein said vinyl lactam polymer with which the mixture of monomers is graft copolymerized is poly-N-vinylpyrrolidone.

10. A method of producing resinous copolymer products which method comprises polymerizing a mixture of copolymerizable monomers that contains between about 20 and 80 mole percent of a monomer of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and between about 80 and 20 percent by weight of at least one alkenyl group-containing organic sulfonic acid compound selected from the group consisting of those having the formulae:

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; $p$ is an integer from 0 to 1; and $r$ is an integer from 1 to 4.

11. Method for the preparation of a graft copolymer which comprises polymerizing between about 10 and 80 percent by weight, based on the weight of the resulting graft copolymer, of a polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; with between about 90 and 20 percent by weight of a vinyl lactam polymer.

12. Method for the preparation of a graft copolymer which comprises polymerizing between about 10 and 80 percent by weight, based on the weight of the resulting graft copolymer, of a mixture of monomers consisting of from about 10 to 90 mole percent of a polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and from about 90 to 10 mole percent of at least one alkenyl group-containing organic sulfonic acid selected from the group consisting of those having the formulae:

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl, $m$ is an integer from 0 to 2; $n$ is an integer from 1 to 2; $p$ is an integer from 0 to 1; and $r$ is an integer from 1 to 4; with between about 90 and 20 percent by weight of a vinyl lactam polymer.

13. Composition comprising a major proportion of (A) a fiber forming polymer of an ethylenically unsaturated monomeric material containing at least about 80 percent by weight of acrylonitrile and (B) a minor proportion of up to about 20 percent by weight, based on the weight of the composition, of a copolymer of (a) from about 20 to 80 mole percent of a polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and (b) from about 80 to 20 mole percent of at least one alkenyl group-containing organic sulfonic acid compound selected from the group consisting of those having the formulae:

$$CH_2=C{-}\underset{Z}{\vert}{-}(CH_2)_p{-}SO_3X \qquad (II)$$

$$CH_2=CH{-}(CH_2)_m{-}SO_3X \qquad (III)$$

$$CH_2=C{-}COO{-}(CH_2)_n{-}SO_3X \atop Z \qquad (IV)$$

$$CH_2=C{-}CONH{-}(CH_2)_n{-}SO_3X \atop Z \qquad (V)$$

$$CH_2=C{-}CH_2{-}NH{-}(CH_2)_n{-}SO_3X \atop Z \qquad (VI)$$

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4.

14. The composition of claim 13, containing between about 6 and 12 percent by weight, based on the weight of the composition, of said copolymer.

15. The composition of claim 13, wherein said copolymer contains about equal mole proportions of polymerized constituents from each monomer.

16. The composition of claim 13, wherein the acrylonitrile polymer is polyacrylonitrile.

17. The composition of claim 13, dispersed in a solvent for polyacrylonitrile.

18. A filamentary shaped article comprised of the composition of claim 13.

19. Composition comprising a major proportion of (A) a fiber forming polymer of a monoethylenically unsaturated monomeric material containing at least about 80 percent by weight of acrylonitrile and (B) a minor proportion of up to about 20 percent by weight, based on the weight of the composition, of a graft copolymer of (a) between about 10 and 80 weight percent of a polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and (b) from about 90 to 20 weight percent of a vinyl lactam polymer.

20. The composition of claim 19, containing between about 5 and 12 percent by weight, based on the weight of the composition, of said graft copolymer.

21. The composition of claim 19, wherein said graft copolymer contains between about 30 and 60 percent by weight of said polyglycol monoester graft copolymerized on said vinyl lactam polymer.

22. The composition of claim 19, wherein component (B) is a graft copolymer of a methoxypolyethylene glycol methacrylate in which the polyethylene glycol constituent has a molecular weight of about 600 upon poly-N-vinyl-2-pyrrolidone.

23. The composition of claim 19, wherein component (B) is a graft copolymer of a methoxypolyethylene glycol methacrylate in which the polyethylene glycol constituent has a molecular weight of about 900 upon poly-N-vinyl-2-pyrrolidone.

24. The composition of claim 19, wherein the acrylonitrile polymer is polyacrylonitrile.

25. The composition of claim 19 dispersed in a solvent for polyacrylonitrile.

26. A filamentary shaped article comprised of the composition of claim 19.

27. A composition comprising a major proportion of (A) a fiber forming polymer of an ethylenically unsaturated monomeric material containing at least about 80 percent by weight of acrylonitrile and (B) a minor proportion of up to about 20 percent by weight, based on the weight of the composition, of a graft copolymer of (a) between about 10 and 80 weight percent of a mixture of monomers consisting of (1) from about 10 to 90 mole percent of a polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and (2) from about 90 to 10 mole percent of at least one alkenyl group-containing organic sulfonic acid compound selected from the group consisting of those having the formulae:

$$CH_2=C{-}\underset{Z}{\vert}{-}(CH_2)_p{-}SO_3X \qquad (II)$$

$$CH_2=CH{-}(CH_2)_m{-}SO_3X \qquad (III)$$

$$CH_2=C{-}COO{-}(CH_2)_n{-}SO_3X \atop Z \qquad (IV)$$

$$CH_2=C{-}CONH{-}(CH_2)_n{-}SO_3X \atop Z \qquad (V)$$

$$CH_2=C{-}CH_2{-}NH{-}(CH_2)_n{-}SO_3X \atop Z \qquad (VI)$$

all wherein X is selected from the group consisting of hydrogen, aliphatic hydrocarbon radicals containing from 1 to 4 carbon atoms and alkali metals; Y is selected from the group consisting of hydrogen, chlorine and bromine;

R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) from about 90 to 20 weight percent of a vinyl lactam polymer.

28. The composition of claim 27 containing between about 5 and 12 percent by weight, based on the weight of the composition, of said graft copolymer.

29. The composition of claim 27, wherein said graft copolymer contains between about 30 and 60 percent by weight of said mixture of monomers graft copolymerized on said vinyl lactam polymer.

30. A composition as set forth in claim 29, wherein said mixture of monomers is comprised of from about 30 to 60 mole percent of said polyglycol monoester of Formula I.

31. The composition of claim 27, wherein component (B) is a graft copolymer of a methoxypolyethylene glycol methacrylate in which the polyethylene glycol constituent has a molecular weight of about 600 and styrene sulfonic acid with poly-N-vinyl-2-pyrrolidone.

32. The composition of claim 27, wherein component (B) is a graft copolymer of methoxypolyethylene glycol methacrylate in which the polyethylene glycol constituent has a molecular weight of about 900 and 2-sulfoethyl-acrylate with poly-N-vinyl-2-pyrrolidone.

33. The composition of claim 27, wherein component (B) is a graft copolymer of methoxypolyethylene glycol methacrylate in which the polyethylene glycol constituent has a molecular weight of about 600 and vinyl benzyl sulfonate with poly-N-vinyl-2-pyrrolidone.

34. The composition of claim 27, wherein the acrylonitrile polymer is polyacrylonitrile.

35. The composition of claim 27 dispersed in a solvent for polyacrylonitrile.

36. A filamentary shaped article comprised of the composition of claim 27.

37. Method for the preparation of a blended polymer composition which comprises immersing an aquagel of a fiber forming polymer of an ethylenically unsaturated monomeric material containing at least about 80 percent by weight of acrylonitrile in the form of a shaped article into a dispersion of a copolymer of (a) from about 20 to 80 mole percent of a polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic member 17 to 5, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and (b) from about 80 to 20 mole percent of at least one alkenyl group-containing organic sulfonic acid compound selected from the group consisting of those having the formulae:

(II)

$CH_2=CH-(CH_2)_m-SO_3X$ (III)

(IV)

(V)

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; until between about 2 and 20 percent by weight of said copolymer, based on the weight of the resulting dry composition weight, is incorporated in said aquagel; and drying said copolymer-containing aquagel to convert it from the aquagel condition to a finished shaped article form.

38. The method of claim 37, wherein said acrylonitrile polymer is polyacrylonitrile.

39. Method for the preparation of a dye-receptive, antistatic, stable to light and heat, synthetic, linear, hydrophobic, blended polymer composition which comprises immersing an aquagel of a fiber forming polymer of an ethylenically unsaturated monomeric material containing at least about 80 percent by weight of acrylonitrile in the form of a shaped article into a dispersion of a graft copolymer of (a) between about 10 and 80 weight percent of a polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and (b) from about 90 to 20 weight percent of a vinyl lactam polymer, until between about 2 and 20 percent by weight of said graft copolymer, based on the resulting dry composition weight, is incorporated in said aquagel; and drying said graft copolymer-containing aquagel to convert it from the aquagel condition to a finished shaped article form.

40. The method of claim 39, wherein said acrylonitrile polymer is polyacrylonitrile.

41. Method for the preparation of a dye-receptive, antistatic, stable to light and heat, synthetic, linear hydrophobic, blended polymer composition which comprises immersing an aquagel of a fiber forming polymer of a monoethylenically unsaturated monomeric material containing at least about 80 percent by weight of acrylonitrile in the form of a shaped article into a dispersion of a graft copolymer of (a) between about 10 and 80 weight percent of a mixture of monomers consisting of (1) from about 10 to 90 mole percent of a polyglycol monoester of the formula:

$$CH_2=CZCO(OC_2H_4)_n(OC_3H_6)_mX \qquad (I)$$

wherein Z is selected from the group consisting of hydrogen and methyl; X is selected from the group consisting of halogens of atomic number 17 to 35, alkoxy radicals containing 1 to 2 carbon atoms and thioalkyl radicals containing from 1 to 2 carbon atoms; $n$ is a number having an average value of from 5 to 100; and $m$ is a number that has an average value from 0 to 10; and (2) from about 90 to 10 mole percent of at least one alkenyl group-containing organic sulfonic acid compound selected from the group consisting of those having the formulae:

(II)

$CH_2=CH-(CH_2)_m-SO_3X$ (III)

(IV)

all wherein X is selected from the group consisting of hydrogen, aliphatic hydrocarbon radicals containing from 1 to 4 carbon atoms and alkali metals; Y is selected from the group consisting of hydrogen, chlorine and bromine; R is selected from the group consisting of methyl and ethyl; Z is selected from the group consisting of hydrogen and methyl; $m$ is an integer from 0 to 2; $n$ is an integer from 1 to 2; $p$ is an integer from 0 to 1; and $r$ is an integer from 1 to 4; and (b) from about 90 to 20 weight percent of a vinyl lactam polymer, until between about 2 to 20 percent by weight of said graft copolymer, based on the resulting dry composition weight, is incorporated in said aquagel; and drying said graft copolymer-containing aquagel to convert it from the aquagel condition to a finished shaped article form.

42. The method of claim 41, wherein said acrylonitrile polymer is polyacrylonitrile.

References Cited in the file of this patent

UNITED STATES PATENTS

| | | |
|---|---|---|
| 2,129,694 | Izard | Sept. 13, 1938 |
| 2,417,312 | MacGregor | Mar. 11, 1947 |
| 2,418,696 | Cameron et al. | Apr. 8, 1947 |
| 2,614,289 | Cresswell et al. | Oct. 21, 1952 |
| 2,723,246 | Boyd | Nov. 8, 1955 |
| 2,776,271 | Coover et al. | Jan. 1, 1957 |
| 2,786,043 | Schuller et al. | Mar. 19, 1957 |
| 2,815,369 | Holt | Dec. 3, 1957 |
| 2,839,430 | Rimmer | June 17, 1958 |

UNITED STATES PATENT OFFICE
CERTIFICATE OF CORRECTION

Patent No. 3,086,956                            April 23, 1963

Ardy Armen et al.

It is hereby certified that error appears in the above numbered patent requiring correction and that the said Letters Patent should read as corrected below.

Column 15, line 6, for "28.7" read -- 8.6 --; column 27, lines 37 and 38, the formula should appear as shown below instead of as in the patent:

$$CH_2 = \underset{Z}{C} - CONH - (CH_2)_n - SO_3X \qquad (V)$$

column 31, line 52, for "17 to 5" read -- 17 to 35 --; column 33, line 15, for "2 to 20" read -- 2 and 20 --.

Signed and sealed this 31st day of March 1964.

(SEAL)
Attest:

ERNEST W. SWIDER                            EDWARD J. BRENNER Attesting Officer                                Commissioner of Patents